United States Patent [19]

Dietlein

[11] Patent Number: 4,890,965
[45] Date of Patent: Jan. 2, 1990

[54] FASTENER WITH RELIEVED THREAD SECTION ENDS

[76] Inventor: Robert W. Dietlein, 1963 Glenbrook House Rd., Glenbrook, Nev. 89413

[21] Appl. No.: 303,117

[22] Filed: Jan. 30, 1989

Related U.S. Application Data

[63] Continuation-in-part of Ser. No. 118,479, Nov. 9, 1987, abandoned.

[51] Int. Cl.⁴ .............................................. F16B 39/28
[52] U.S. Cl. .................................. 411/280; 411/282; 411/283; 411/937.1
[58] Field of Search ................ 411/280, 278–282, 411/437, 283, 937, 937.1, 324, 947

[56] References Cited

U.S. PATENT DOCUMENTS

| | | | |
|---|---|---|---|
| 118,238 | 8/1871 | Harvey | 411/937.1 X |
| 219,783 | 9/1879 | Vaughan | 411/280 |
| 993,371 | 5/1911 | Hines | 411/280 |
| 1,646,366 | 10/1927 | Carr | 411/937.1 X |
| 1,755,590 | 4/1930 | Carr | 411/427 X |
| 2,289,309 | 7/1942 | Van Winkle, Jr. | 411/280 |
| 2,290,270 | 7/1942 | Brackett | 411/280 |
| 2,846,701 | 8/1958 | Bedford, Jr. | 411/280 X |
| 3,702,628 | 11/1972 | Cosenza | 411/280 |

FOREIGN PATENT DOCUMENTS

| | | | |
|---|---|---|---|
| 498304 | 10/1919 | France | 441/280 |
| 1099759 | 3/1955 | France | 411/280 |
| 16223 | 7/1910 | United Kingdom | 411/280 |
| 707614 | 4/1954 | United Kingdom | 411/280 |

*Primary Examiner*—Lloyd A. Gall
*Attorney, Agent, or Firm*—William W. Haefliger

[57] ABSTRACT

A lock nut has locking members with internal thread segments formed between slots, the segment ends being relieved to prevent galling; also, the members are deformed so that thread segments therein extend along generally circular arcs that have axes offset from the nut axis. Typically, the axes associated with the arcs on said members are at the respectiveسdes of the body axis opposite from said respective members.

7 Claims, 3 Drawing Sheets

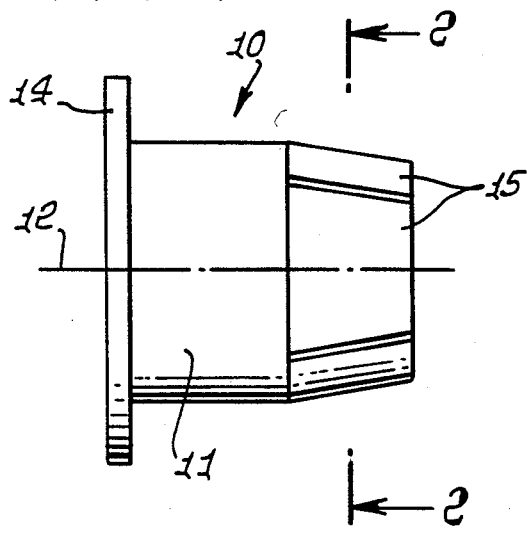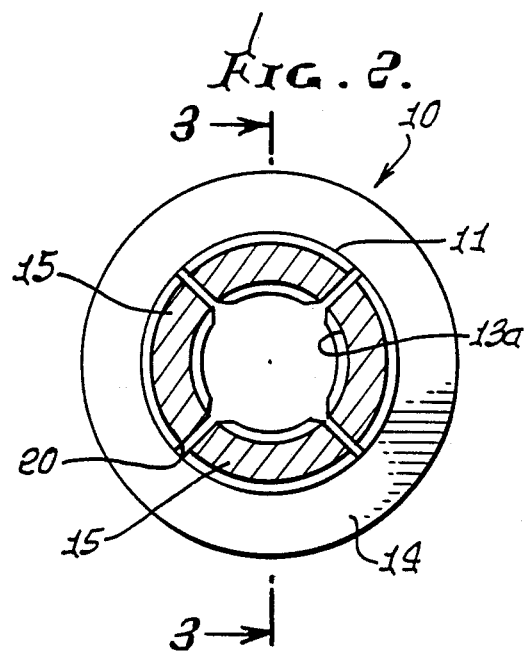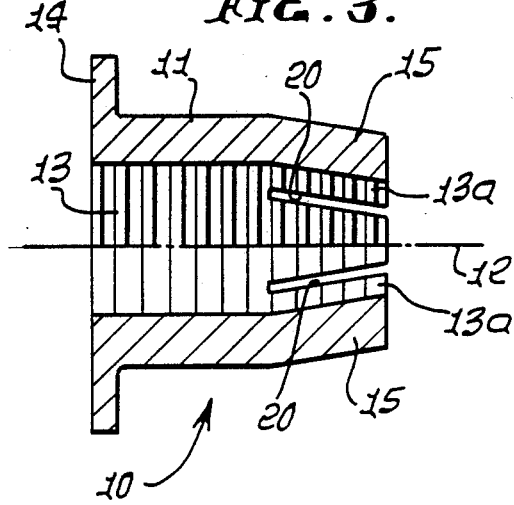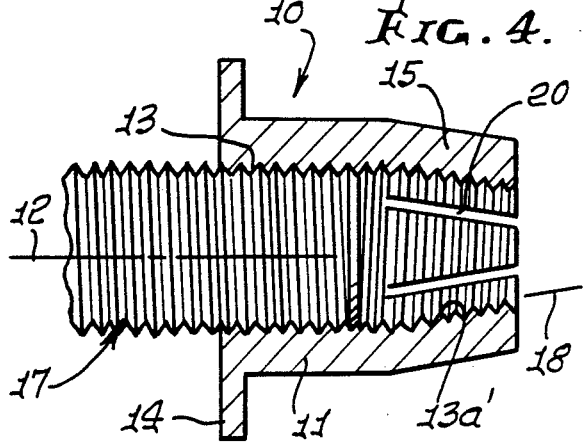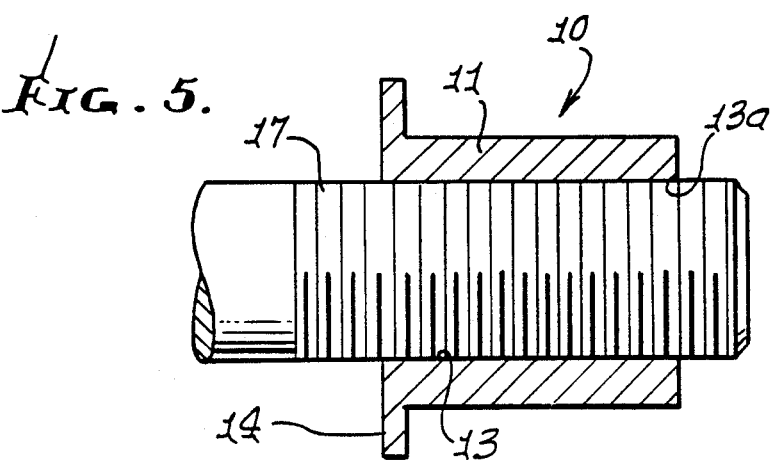

FASTENER WITH RELIEVED THREAD SECTION ENDS

This application is a continuation-in-part of Ser. No. 118,479 filed Nov. 9, 1987, now abandoned.

BACKGROUND OF THE INVENTION

This invention relates generally to lock nuts, and more particularly to improvements in such nuts wherein cantilevered locking segments are permanently deflected or angled radially inwardly to resiliently grip the bolt threadably received by the nut.

In a typical nut of this type, the upper portion of the nut is segmented by slotting the threaded wall and then inwardly deflecting these segments toward the central axis. This permanent deflection of the locking segments is greatest at the exit end of the thread thus allowing more flexibility of these segments than the entry end of the locking device. These beam-like locking segments are essential to a good locking action and provide excellent flexibility while providing a frictional force on the flanks of the thread of the mating male fastener. This frictional force provides what is known as prevailing torque when there is relative rotation of the two elements. The relative rotation of the two elements and the slots between the locking segments, irrespective of the number of slots, cause early failure of both of the mating elements. Since the screw or bolt has an interference contact at the slots of approximately 90° and the slots present sharp cutting edges, these slots act like a thread cutting die of the type used for cutting threads on a pipe, rod or bolt. The cutting edges consequently shave or cut plating or metal off the flanks of the mating screw or bolt. This soon causes galling and reduction of the pitch diameter of the screw or bolt and also an increase in the pitch diameter of the lock nut, so that there soon is a loss of the locking action of the nut, or complete seizing of the two mating elements.

There is need for an improved nut of this type, which is so constructed as to eliminate the cutting and galling action.

SUMMARY OF THE INVENTION

It is a major object of the invention to provide an improved lock nut meeting the above need. Basically, the invention provides a particular relief of the slot cutting edges, so that they no longer are able to shave or cut the bolt threading. As will be seen, the nut comprises:

(a) an annular body defining an axis and having an internal thread along its axial length, (b) locking members integral with and projecting generally axially of the body, at one end thereof, the members being circumferentially spaced about said axis, to define radial slots between the members, (c) the members having internal thread segments at their sides facing said axis, (d) the thread segments having opposite ends, circumferentially, which are relieved, so that their inner edges are spaced further from the body axis than the thread segment mid portions, (e) the members being cantilever members that taper toward said axis along member length between the slots, (f) each member further deformed so that thread segments thereon extend along generally circular arcs that have an axis or axes offset from said body axis.

further, and as will be seen, the flared slots may be generally triangular in outline, in cross section, at opposite ends of successive segments; alternatively, the flared slots are generally concave in cross section outline, at opposite ends of circularly successive segments. The slot opposed walls preferably extend at about 90°, or more; and the slot angled walls extend to a depth exceeding the pitch diameter of the nut thread.

Further, the thread segments typically have minor diameters that define a frusto-conical surface tapering away from the annular body; and there are between 4 and 6 of such anti-galling slots formed between the members, although other numbers of slots can be used.

Also, the thread segments mesh with external threads of a fastener acting to expand the members, the nut thread segments having larger radii than the threading of the fastener engaged therewith; and the crests of the fastener threads only penetrate to about the pitch diameter of the member thread segments.

These and other objects and advantages of the invention, as well as the details of an illustrative embodiment, will be more fully understood from the following specification and drawings, in which:

DRAWING DESCRIPTION

FIG. 1 is a side elevation showing a lock nut incorporating the invention;

FIG. 2 is a section on lines 2—2 of FIG. 1;

FIG. 3 is a section on lines 3—3 of FIG. 2;

FIG. 4 is a section through the lock nut of FIGS. 1-3, showing initial reception of a bolt;

FIG. 5 is a view like FIG. 4 showing full reception of a bolt;

DETAILED DESCRIPTION

Figure 6:
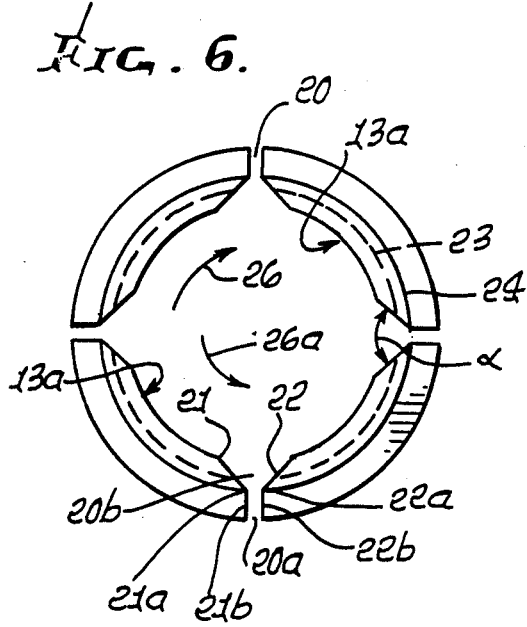
FIG. 6 is an end view of a nut like the nut of FIGS. 1-5.

In FIGS. 1-5, the lock nut 10 includes an annular body member 11 defining a central axis 12, and has an internal thread 13 extending along its axial lengths. The nut has an external radial flange 14 at an end thereof, as shown.

The nut includes locking members 15 that are integral with and project from the body member at the opposite end thereof. The members 15 extend in cantilever relation generally axially, four of such like members being shown. The members are circumferentially spaced about axis 12 to define radially extending slots therebetween, and they have internal thread segments 13a at their sides facing axis 12. the segments 13a form a thread continuation of thread 13, whereby an externally threaded bolt 17 may be started through the member 11, as the nut is rotated onto the bolt, or vice versa, and continued relative rotation causes full reception of the bolt threads tightly into the thread segments 13a, and tending to urge and resiliently deflect the cantilevered members 15 radially outwardly. Typically, the thread segments 13a define a minor diameter 13a', i.e., at internal crests, that form a frusto-conical surface further indicated at 18 and which tapers away from the annular body member 11. Thus, the cantilever locking members 15 may themselves taper axially away from the body 11, and toward axis 12, or their thread segments may so taper. Slots 20 are formed circumferentially between segments 13a.

In accordance with an important aspect of the invention, the thread segments 13a have opposite ends, circumferentially, which are relieved, so that the slots 20 flare in radially inward direction and at said opposite sides of the segments. As better seen in FIG. 6, the slots 20 have radially outer extents 20a, and radially inner extents 20b, the latter flaring inwardly as described, between thread segment opposite ends 21 and 22 defining the flare. Ends 21 and 22 intersect at 21a and 22a, the walls 21b and 22b of the slot extents 20a and 20b which are not so flared. Intersections 21a and 22a lie outwardly of the thread pitch diameter indicated at 23. The thread major diameter is indicated at 24.

Figure 7:
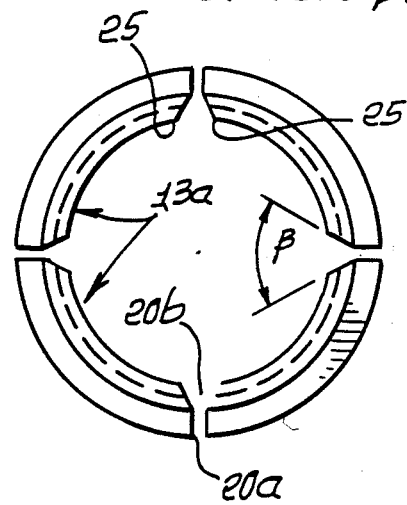
FIGS. 7-9 are views like FIG. 6, showing modifications.
Figure 8:
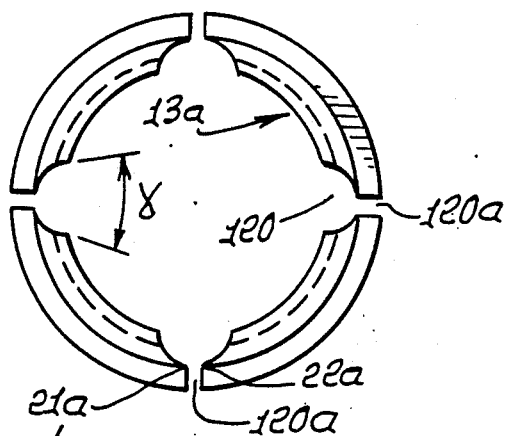

In FIGS. 6 and 7, the flare slots are generally triangular in outline; whereas in FIG. 8, the flared slots 120 are generally concave in outline, intersecting slot outer extent 120a at the thread major diameter. In FIG. 6, the slot walls 21 and 22 form an angle $\alpha$ which is about 90°; whereas in FIG. 7, the corresponding angle $\beta$ is about 55°. The angularity is such that the edges 25 of the thread segments do not cut into or gall the bolt threads upon make up of the thread and bolt, with the nut turning in either relatively rotary directions 26 or 26a (i.e., tightening or loosening). Thus, the flare of the slot produces a "camming" sliding action of the slot wall over the tightly engaged bolt thread.

Figure 10:
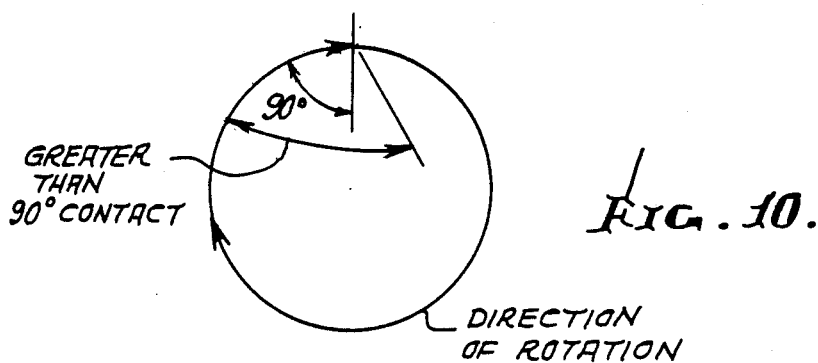
FIG. 10 is a diagram showing lack of cutting action during nut rotation.

FIG. 10 is a diagrammatic view showing greater than 90° "contact" of the edge 25 with the bolt thread.

Figure 9:
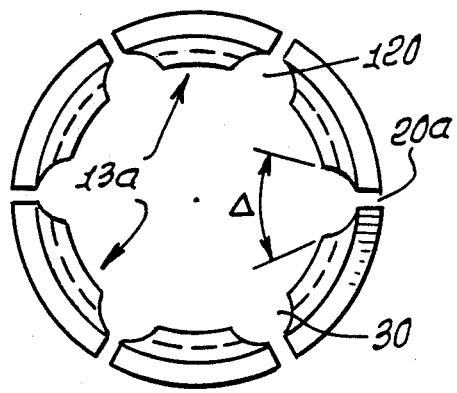

FIG. 9 shows a six slotted form of the nut, with concave slots 30 flaring inwardly toward axis 12. Otherwise, the construction is like that of FIG. 8.

The slot relief, i.e., enlarged slots as at 20b, 120 and 30, extend along the full lengths of the segments 13a.

In FIG. 8, the slot flare angle $\gamma$ at the intersection with the thread inner diameter is at least about 55°, and the same is true for the slot flare angle $\Delta$ in FIG. 9 in order to produce the antigalling effect desired.

In the above, between 2 and 12 slots can be used.

Figure 11:
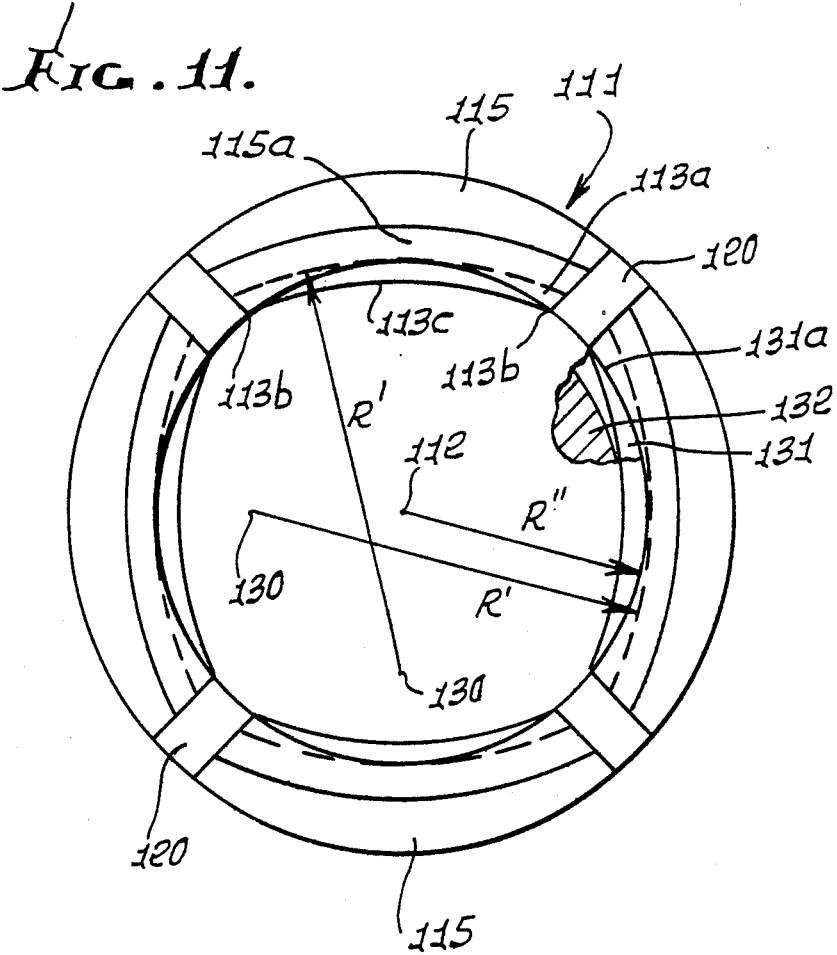
FIG. 11 is an end view partly in section showing meshing of a nut thread with the thread segments on the nut member, the view looking axially.

In FIG. 11, locking members 115 are integral with and project generally axially of the body 111 at one end thereof, the members being circumferentially spaced about nut axis 112 to define radial slots 120 between the members, as before. Also, the members have internal thread segments 113a at their sides facing that axis. The thread segments have opposite ends, circumferentially, and are relieved radially outwardly so that the end inner edges 113b are spaced further from the axis 112 than the thread segment mid portions 113c. In effect, the member mid portions 115a are "displaced" toward axis 112.

The members being cantilever members taper toward axis 112 along member length between the slots 120; and each member is effectively deformed so that thread segments 113a thereon extend along generally circular arcs that have axes 130 offset from said body axis, when the thread 131 of bolt or fastener 132 member meshes with segments 113a to resiliently expand the cantilevered members 115 outwardly. Axis 130 of each segment 113a is at the side of axis 112 opposite from that segment.

The effect of the foregoing is to prevent galling contact of edges 113b with the flanks of the fastener thread. Note that in FIG. 11, the edges 113b are located in the space between successive crests 131a of the fastener thread. At most, the crests 131a only penetrate to about the pitch diameter of the nut member thread segments, as shown.

When assembled, the radii of the nut member segment thread pitch diameter appear at R'; and the fastener thread crest radii appear at R''; where R'>>R''.

As is clear from FIG. 11, the curvature of the arcs of segments 113a is less than the curvature of the body outer surface, outwardly of the segments, (that outer surface corresponding to surface 11 in FIG. 1) the latter being concentric to the fastener thread.

I claim:
1. In a lock nut, the combination comprising:
 (a) an annular body defining an axis and having an internal thread along its axial length,
 (b) locking members integral with and projecting generally axially of the body, at one end thereof, the members being circumferentially spaced about said axis, to define at least three radial slots between the members, the slots equally spaced about said axis,
 (c) the members having internal thread segments at their sides facing the axis,
 (d) the thread segments having opposite ends, circumferentially with inner edges spaced further from the body axis than the thread segment mid portions,
 (e) the members being cantilever members that taper toward said axis along member length between the slots,
 (f) each member further deformed so that thread segments thereon extend along generally circular arcs that have axes offset from said body axis,
 (g) said thread segments having arc curvature, and said body outwardly of said segments having an outward surface with curvature, said arc curvature being less than said body outward surface curvature.

2. The combination of claim 1 wherein said thread segments have pitch diameters, the slots intersecting said pitch diameters.

3. The combination of claim 1 wherein there are between 3 and 12 of said slots between said members.

4. The combination of claim 1 wherein said axes associated with said arcs on said members are at the respective sides of the body axis opposite from said respective members.

5. The combination of claim 1 including a fastener having external threads meshing with the thread segments of the nut and acting to expand same, the thread segments of the nut having larger radii than the threading of the fastener engaged therewith.

6. The combination of claim 5 wherein the crests of the fastener threads only penetrate to about the pitch diameter of the thread segments.

7. The combination of claim 6 wherein the crests of the fastener threads have radii R'', and the pitch diameters of the nut thread segments have radii R', where R'>>R''.

* * * * *